United States Patent
Wedel et al.

(10) Patent No.: US 7,750,854 B2
(45) Date of Patent: Jul. 6, 2010

(54) COMBINED SPEAKER AND ANTENNA COMPONENT

(75) Inventors: Martin Wedel, Malmö (SE); Georgeta Anton, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/544,121

(22) PCT Filed: Feb. 4, 2004

(86) PCT No.: PCT/EP2004/001003

§ 371 (c)(1), (2), (4) Date: Aug. 2, 2005

(87) PCT Pub. No.: WO2004/070871

PCT Pub. Date: Aug. 19, 2004

(65) Prior Publication Data

US 2006/0038733 A1    Feb. 23, 2006

Related U.S. Application Data

(60) Provisional application No. 60/449,701, filed on Feb. 24, 2003.

(30) Foreign Application Priority Data

Feb. 10, 2003    (EP)    ................... 03445020

(51) Int. Cl.
  *H01Q 1/24*    (2006.01)
(52) U.S. Cl. .................................... 343/702
(58) Field of Classification Search ........... 343/702, 343/795, 846; 455/575.1–575.9, 90.1–90.3
See application file for complete search history.

(56) References Cited

U.S. PATENT DOCUMENTS

| 6,031,505 | A | 2/2000 | Qi et al. ....................... 343/795 |
| 6,208,874 | B1 * | 3/2001 | Rudisill et al. ........... 455/575.4 |
| 6,297,778 | B1 * | 10/2001 | Phillips et al. .............. 343/702 |
| 6,360,105 | B2 * | 3/2002 | Nakada et al. ........... 455/575.7 |

(Continued)

FOREIGN PATENT DOCUMENTS

DE    10052909 A1    5/2002

(Continued)

OTHER PUBLICATIONS

*International Search Report dated May 13, 2004 for corresponding PCT application No. PCT/EP2004/001003.

*Primary Examiner*—Hoang V Nguyen
*Assistant Examiner*—Robert Karacsony
(74) *Attorney, Agent, or Firm*—Myers Bigel Sibley & Sajovec, P.A.

(57) ABSTRACT

A combined speaker and antenna arrangement for a communication terminal, includes a support structure carrying a first antenna element, and a second antenna element arranged at a predetermined distance from said first antenna element. The second antenna element is a conductive first portion of a sheet of flexible film. An elongated second portion of the flexible film, carrying a conductive lead, extends from adjacent to the first portion to a speaker connected to an outer end of the elongated second portion. The second, elongated portion, is bent such that the speaker is positioned between the film and the support structure, adjacent to an aperture in the first portion.

21 Claims, 5 Drawing Sheets

U.S. PATENT DOCUMENTS

| | | | |
|---|---|---|---|
| 6,741,221 B2 * | 5/2004 | Aisenbrey | 343/897 |
| 7,107,016 B2 * | 9/2006 | Dufosse et al. | 455/90.1 |
| 2001/0052879 A1 * | 12/2001 | Gunee et al. | 343/702 |
| 2002/0000940 A1 * | 1/2002 | Moren et al. | 343/702 |
| 2002/0171587 A1 * | 11/2002 | Fu | 343/700 MS |
| 2003/0032443 A1 * | 2/2003 | Johnson et al. | 455/550 |
| 2003/0156065 A1 * | 8/2003 | Jo et al. | 343/700 MS |

FOREIGN PATENT DOCUMENTS

| | | | |
|---|---|---|---|
| EP | 1184936 A1 | | 3/2002 |
| EP | 1294051 A1 | | 3/2003 |
| EP | 1317116 A1 | | 6/2003 |
| EP | 1317116 B1 | | 5/2005 |
| JP | 2002028287 A | * | 1/2002 |
| WO | WO 00/38475 | | 6/2000 |
| WO | WO01/47056 | * | 6/2001 |
| WO | WO02/35810 | * | 5/2002 |

* cited by examiner

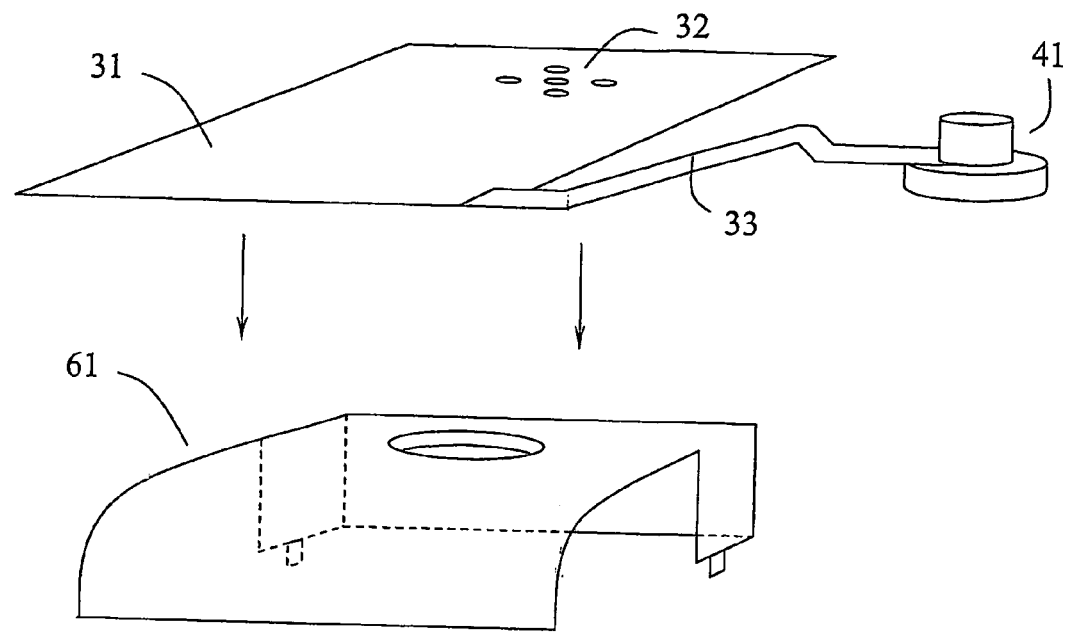
Fig. 7
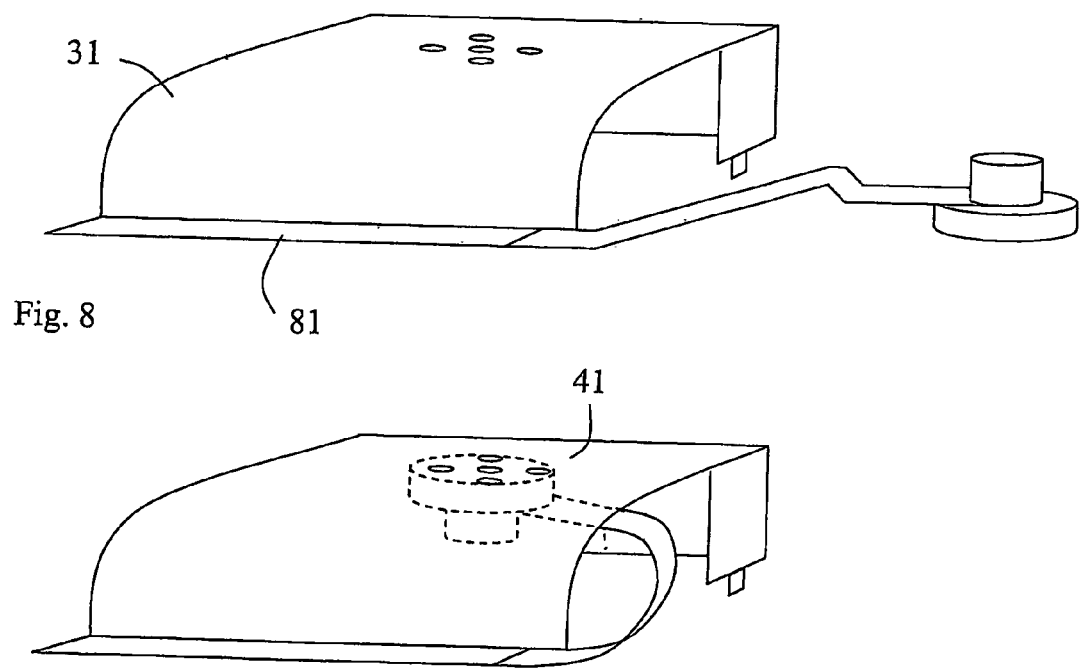
Fig. 8
Fig. 9

COMBINED SPEAKER AND ANTENNA COMPONENT

RELATED APPLICATIONS

The present application is a 35 U.S.C. §371 national phase application of PCT International Application No. PCT/EP2004/001003, having an international filing date of Feb. 4, 2004, and claiming priority to European Patent Application No. 03445020.5, filed Feb. 10, 2003, and United States Provisional Application No. 60/449,701 filed Feb. 24, 2003, the disclosures of which are incorporated herein by reference in their entireties. The above PCT International Application was published in the English language and has International Publication No. WO 2004/070871 A1.

FIELD OF THE INVENTION

The present invention relates generally to a communication terminal comprising an antenna for wireless communication purposes, and a speaker for conveying audio information to a user of the communication terminal. More specifically the invention relates to a communication terminal including a component which integrates said speaker and an antenna element, and to said component as such.

BACKGROUND

The mobile phone industry has had an enormous development both regarding quality of service and transmission capabilities, as well as the technology for producing advanced communications terminals. In only a couple of decades the communication systems have gone from analogue to digital, and at the same time the dimensions of the communication terminals have gone from briefcase size to the pocket size phones of today. Still today, mobile phones are getting smaller and smaller and the size is generally considered to be an important factor for the end customer. The development in electronics has made it possible to miniaturise the components of the terminals, at the same time making the terminals capable of performing more advanced functions and services. The development of new transmission schemes, the so-called $3^{rd}$ generation mobile system standing at the door and the $4^{th}$ generation to be expected maybe ten years later, also provides the possibility to convey more advanced data to the wireless communication terminals, such as real time video.

In order to benefit from the capabilities of the transmission system, the future generation of phones will have a large display in order to perform multimedia input and output, and the picture quality will be of high importance. Still, the keypad or keyboard must be large enough to allow people to press one key at a time.

FIG. 1 discloses a typical example of a state of the art mobile phone 1, carried by a housing or chassis 2. The size of a keypad 4 and a display 3 basically sets the limit of how small the terminal 1 can be. However, to be able to work as a standard phone for voice interaction, the terminal 1 also includes a microphone 5 and a speaker 6, preferably arranged at opposite ends of the terminal 1. FIG. 2 discloses a different embodiment of a state of the art communication terminal 1, wherein the display 3 occupies a larger portion of the front side of the terminal. Several of the functions of the keypad 4 have been included in a graphical user interface applicable to the display 3, rendering a data input interface having less keys. Those keys 4 may also be moved to the side of the communication terminal in order to allow for the display 3 to occupy a larger portion of the front side of terminal 1. A specific tool 8 may be provided for inputting data on a touch-sensitive screen of the display 3. FIGS. 1 and 3 show two typical examples of state of the art communication terminals 1, whereas the skilled persons will realise that combinations of the two are also well known as well as other designs, such as a so called clamshell type terminal.

In the state of the art communication terminal a terminal output 7 is mounted on the front of the terminal above the display with the speaker 6 immediately behind the output 7, as shown in FIGS. 1 and 2. This means that even with a smallest available speaker used today, with a diameter of about 13 mm, the terminal would be approximately this much longer in its longitudinal extension than what would have been the case if only the display 3 and/or keypad 4 had defined the length of the terminal 1. The antenna of the terminal is generally located at the upper portion of the terminal, and a lower portion of the terminal being occupied by a battery. Placing the speaker 6 behind the display 3 would therefore increase the thickness of the terminal 1 since it would have to compete with the antenna for the relevant space.

The performance of the speaker is to a high extent dependent on the back volume, i.e. the acoustic resonance cavity behind the speaker. As mentioned above, almost every phone today has the speaker position in the upper parts of the front of the terminal above the display and keyboard. However, also the antenna is preferably placed at the upper portion of the terminal. Today, built in antennas are primarily used, such as e.g. PIFAs, Planar Inverted-F Antenna, or micro strip antennas. Such designs also require a certain space or distance between an active antenna element and a ground plane, in order to provide sufficient bandwidth. Consequently, placing the speaker and the antenna one over the other, in a longitudinal direction of the terminal, will add to the length of the terminal. On the other hand, placing the antenna behind the speaker will add to the thickness of the terminal. Therefore, both the antenna design and the speaker design, and their relative position, will affect the dimensions of the terminal.

A solution to this problem of miniaturisation of communication terminals is proposed in WO 00/38475, in which the acoustic resonance chamber of the speaker is completely or partly located in the electromagnetic resonance chamber of the antenna. The use of a single resonance chamber instead of two separate ones makes it possible to manufacture smaller communication devices. According to the proposed solutions the speaker is placed outside the resonance chamber, the backside of the speaker being connected to the resonance chamber by at least one acoustic channel. However, the speaker and the common chamber will still both add to the thickness of the terminal.

SUMMARY OF THE INVENTION

It is an object of the present invention to provide a novel speaker arrangement for a communication terminal, meeting the general market demand for small size and light weight terminals.

Furthermore, an aspect of this object is to provide such a speaker arrangement, which can be produced in a reliable and cost-effective manufacturing process.

Yet another aspect of this object is to provide such a speaker arrangement integrated with an antenna element of the terminal, in a way that does not impede antenna performance.

According to a first aspect of the present invention, this object is filled by an integrated speaker and antenna element carrier for a communication terminal, comprising a sheet of a flexible film having a conductive first portion forming an antenna element, and an elongated second portion carrying a conductive lead extending from adjacent to said first portion to a speaker connection pad at an outer end of said elongated second portion.

Preferably, said second portion carries a pair of conductive leads from adjacent said first portion to respective speaker connection pads.

Advantageously, said second portion carries at least one conductive lead which is electrically insulated from said first portion.

In one embodiment, said first conductive portion and said lead are shaped by material removal from a conductive layer on the film, and preferably by etching of said conductive layer.

In a preferred embodiment, said second portion is devised to carry a speaker connected to said speaker connection pad, wherein said second elongated portion is bendable such that said speaker is positioned at an aperture in said first portion.

In one embodiment, said conductive lead extends from a connection pad arranged adjacent to said first portion at a straight edge of said flexible film.

In a specific embodiment, said conductive first portion is a ground plane of an antenna for a radio communication terminal. Alternatively, said conductive first portion is a an antenna element of an antenna for a radio communication terminal, and has a pattern adapted to provide resonance at predetermined radio frequencies.

According to a second aspect of the present invention, the stated object is fulfilled by a combined speaker and antenna arrangement for a communication terminal, comprising a support structure carrying a first antenna element and a second antenna element arranged at a predetermined distance from said first antenna element, wherein said second antenna element is a conductive first portion of a sheet of flexible film, wherein an elongated second portion of said flexible film, carrying a conductive lead, extends from adjacent to said first portion to a speaker connected to an outer end of said elongated second portion.

Preferably, said second elongated portion is bent such that said speaker is positioned between said film and said support structure, adjacent to an aperture in said first portion.

In one embodiment, said flexible film is attached to said support structure such that said conductive first portion is electrically connected to a ground plane of said support structure, and preferably said flexible film is attached, at a side edge thereof, to said support structure, at which side edge a connector pad to said conductive lead is arranged. In a more specific embodiment, said connector pad is connected, at said second side edge, to speaker control circuitry arranged on said support structure.

In one embodiment, said flexible film is bar soldered at a straight edge to said support structure, at which straight said conductive first portion is electrically connected to a ground plane of said support structure, and a connector pad to said conductive lead is connected to speaker control circuitry arranged on said support structure.

In one embodiment, of the combined speaker and antenna arrangement, an insulating spacer is arranged intermediate said support structure and said flexible film, defining said predetermined distance between said first and second antenna elements.

Said spacer preferably comprises speaker attachment means, devised to secure said speaker adjacent to said aperture.

In one embodiment, said flexible film is attached to said spacer with an adhesive.

In one embodiment, said spacer is attached to said support structure by cooperating engagement members. In a more specific embodiment, said spacer has a protruding member engaging with a recess in said support structure.

Preferably, said support structure is a printed circuit board of a radio communication terminal.

According to a third aspect of the present invention, the stated object is fulfilled by a radio communication terminal, comprising a combined speaker and antenna arrangement as recited above.

According to a fourth aspect of the present invention, the stated object is fulfilled by a method for producing an integrated speaker and antenna element carrier for a communication terminal, comprising the steps of:

providing a flexible film of an insulating material;
coating said film with a conductive material;
removing selected portions of the conductive material from the film, to define a first conductive surface portion, and a lead, insulated from said first portion and extending away from adjacent to said first portion; and
cutting the film such that en elongated second portion thereof, carrying said lead, is shaped.

Preferably, said removing of selected portions of the conductive material including the step of etching.

Furthermore, said step of removing of selected portions of the conductive material, preferably comprises the defining of a pair of separate leads, insulated from said first portion and extending away from adjacent to said first portion.

BRIEF DESCRIPTION OF THE DRAWINGS

Further features and advantages of the present invention will become more apparent from the following description of preferred embodiments, with reference to the accompanying drawings, on which FIG. 1 schematically shows a typical communication terminal design of a first type;

FIGS. 7 to 9 illustrate assembly of the integrated speaker and antenna element of FIG. 5 with the spacer member of FIG. 6, in accordance with an embodiment of he invention;

DETAILED DESCRIPTION OF PREFERRED EMBODIMENTS

The present description refers to communications terminals as a device in which to implement the speaker configuration according to the present invention. The communication terminal includes all mobile equipment devised for radio communication with a radio station, which radio station also may be a mobile terminal or e.g. a stationary base station. Consequently, the term "communication terminal" includes mobile phones, pagers, communicators, electronic organisers, smart phones, PDA:s (Personal Digit Assistants), vehicle-mounted radio communication devices or the like, as well as portable laptop computers devised for wireless communication in for instance WLAN (Wireless Local Area Network). Furthermore, since the design and present invention is suitable for but not restricted to mobile use, the term "communication terminal" should also be understood as to include any stationary device arranged for radio communication, such as for instance desk top computers, printers, fax machines and so on, devised to operate with radio communication with each other or some other radio station. Hence, although the structure and characteristics of the combined antenna and speaker design according to the invention is mainly described herein, by way of example, in the implementation in a mobile phone, this is not to be interpreted as excluding the implementation of the inventive design in other types of radio terminals, such as those listed above. Furthermore, it should be emphasised that the term "comprising" or "comprises" when used in this description and in the appended claims to indicate included features, elements or steps, is in no way to be interpreted as excluding the presence of other features, elements or steps than those expressed or stated.

Figure 1:
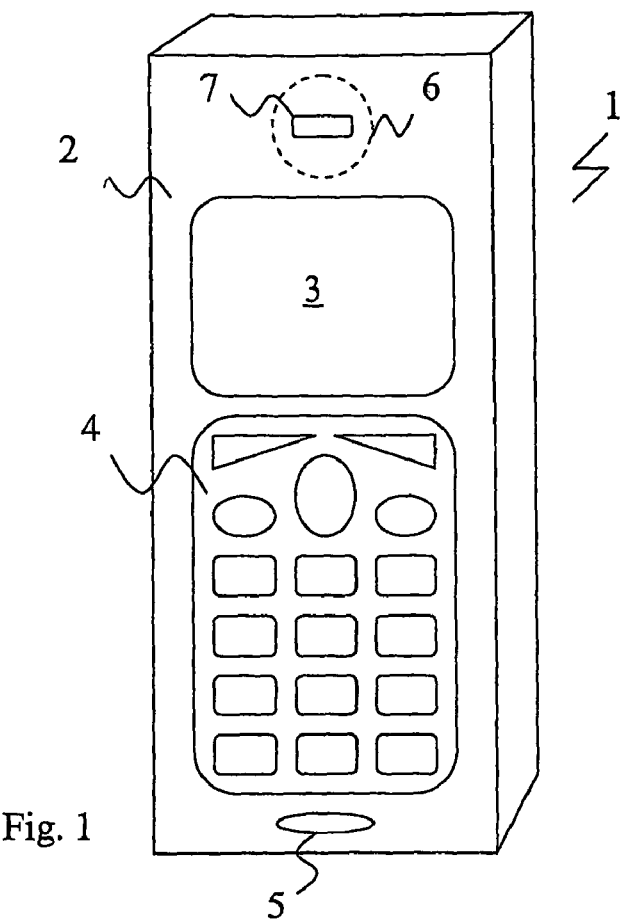
Figure 2:
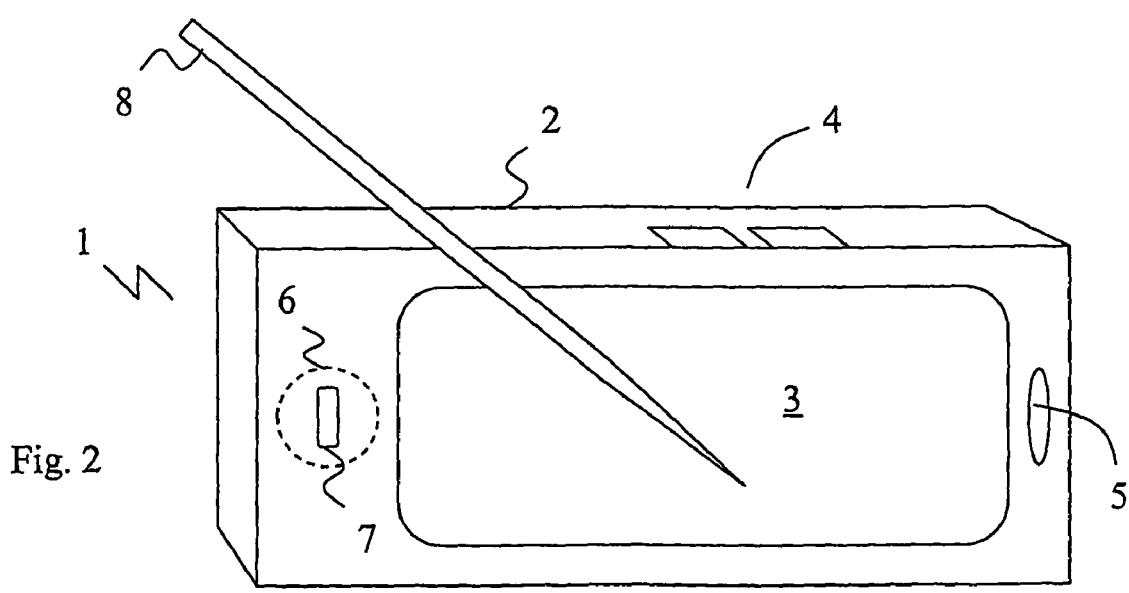
FIG. 2 schematically illustrates a typical communication terminal design of a second type.
Figure 3:
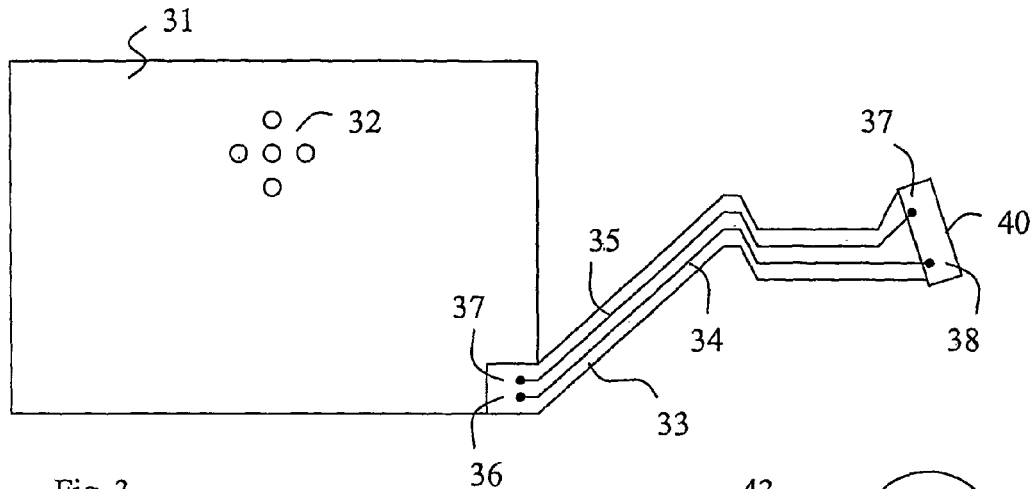
FIG. 3 illustrates an integrated speaker and antenna element carrier according to an embodiment of the present invention.

FIG. 3 illustrates a basic device according to the invention, constituting a combined antenna element and speaker carrier. A sheet of flexible film in an electrically non-conductive material is provided. The material is preferably some form of polymer, e.g. a polyimide such as Kapton®. The film has a first portion 31 which preferably represents a major portion of the surface of the film. In the illustrated exemplary embodiment, first portion 31 is rectangular, but it may have alternative shapes dependent on the particular application. First portion 31 has a coating or layer of electrically conductive material, such as copper, and first portion 31 represents an antenna element 31 for a radio antenna. In a preferred embodiment, first portion 31 is a single and continuous conductive area, usable as a ground plane for a radio antenna. Alternatively, the first portion 31 may be an active antenna element with a (not shown) structure defining resonance for suitable radio frequencies. This will be further described below.

An aperture, or set of apertures, 32 is provided in said first portion 31. This aperture 32 represents an audio or sound transfer opening in the flexible film, for the purpose of conveying sound waves from a speaker through the film.

A second, elongated, portion 33 of the film extends from a side of first portion 31. Second portion 32 has a substantially non-conductive surface. However, at least a first lead 34 is formed on the second portion 33, extending from a proximal connection pad 36, located on the film close to first portion 31, but electrically insulated from the first portion 31. Said first lead extends from said proximal connection pad 36, along the extension of the second portion 33, to a distal connection pad 38 located at an outer end 40 of the second portion 33. Preferably, second portion 33 carries two separate leads 34,35 from proximal connection pads 36,37 to distal connection pads 38,39 at said outer end of the elongated second portion 33. Preferably both are insulated from the first portion 31, though in one embodiment one of the leads is connected to the first portion.

In a preferred embodiment, a device according to the invention, and as illustrated in FIG. 3, is manufactured by a coating, etching and cutting procedure. A flexible film of an insulating material is provided. The film is coated, e.g. by means of a suitable well known procedure, with a conductive material such as copper. The coating may be performed with a mask applied to the film or coating device, such that the coating material is only applied at desired locations. However, in a preferred embodiment the coat is applied over the entire flexible film sheet. Subsequently, selected portions of the conductive material are removed from the film, to define the first conductive surface portion 31, and one ore more leads 34,35 and their connection pads. This step is preferably exercised by etching the conductive material using a suitable dry or wet etching method and a mask defining the desired pattern. Finally, the film is cut such that the elongated second portion carrying the leads, and the aperture 32, are shaped. Needless to say, plural structures like the one illustrated in FIG. 3 may be shaped by coating and etching on a single piece of flexible film, wherein said plural structures are separated in the subsequent cutting step.

Figure 4:
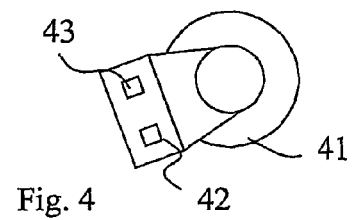
FIG. 4 illustrates a speaker for use with a carrier according to FIG. 3.

FIG. 4 illustrates a speaker 41 suitable for use with a device according to FIG. 3. In accordance with the invention, the lead 34 on the second portion 33 of the film is preferably used as a speaker signal lead. Consequently, the outer end 40 of second portion 33 is adapted for connection of a speaker, such as speaker 41. FIG. 4 illustrates a back side of speaker 41, and connectors 42, 43 which are connectable to speaker signal leads, preferably by soldering or thermo-compression.

Figure 5:
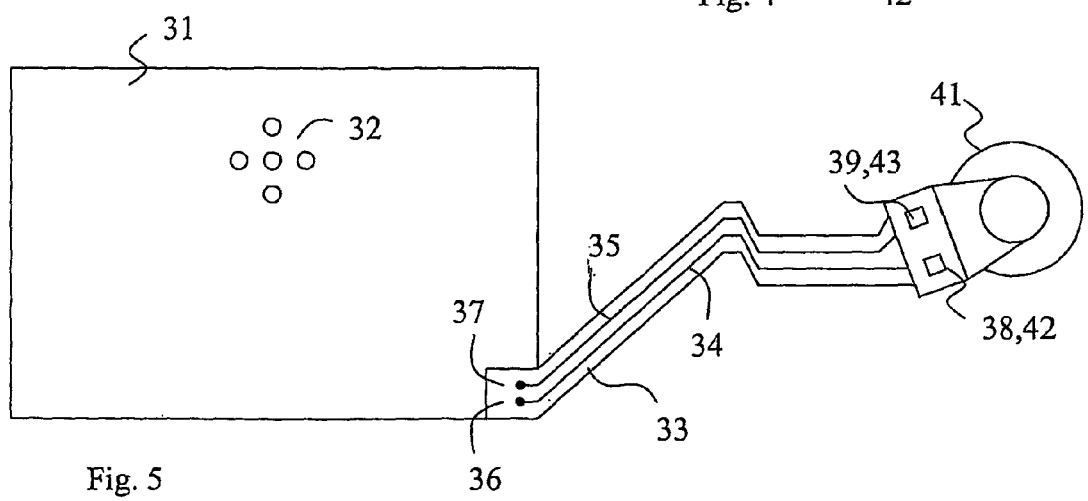
FIG. 5 illustrates an integrated speaker and antenna element carrier according to FIG. 3 with a speaker attached.

FIG. 5 illustrates the device according to FIG. 3 when connected to speaker 41 of FIG. 4. Distal connection pad 38, which constitutes a speaker connection pad 38, is connected to speaker connector 42, whereas distal connection pad 39, which constitutes a speaker connection pad 39, is connected to speaker connector 43. The speaker 41 may also be mechanically fixed to outer end 40, e.g. by clamping on the outer end 40 of the film. FIG. 5 illustrates a combined speaker and antenna element 50, representing a single component with two distinctly different technical features. As will be described below, the combined device according to FIG. 5 provides a structure with several advantages, as will become clear. The following description defines the use of the present invention in a radio communication terminal, and particularly on the application of the present invention in a mobile phone. However, as previously outlined, the present invention is not restricted to this field, which is to be regarded as a suitable application.

Figure 6:
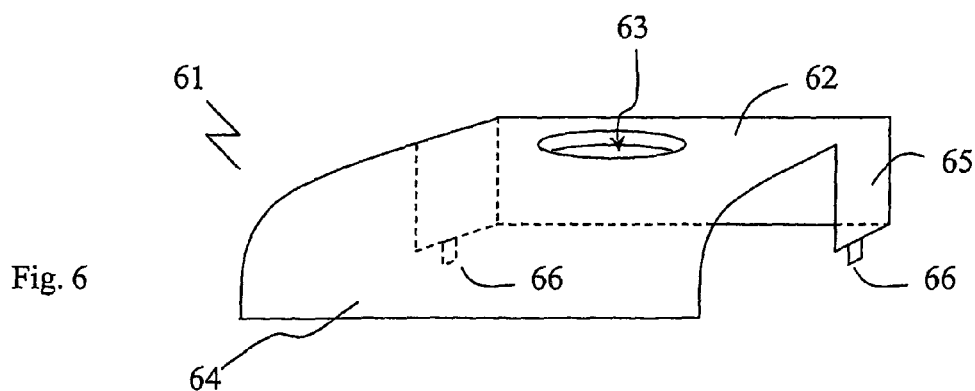
FIG. 6 illustrates a spacer member devised for assembly with a device as shown in FIG. 3, according to an embodiment of the invention.

FIG. 6 illustrates an embodiment of a spacer element 61, adapted for use with the combined speaker and antenna element according to the invention In a low profile, built in, radio antenna for mobile communication, such as a PIFA, the antenna comprises a substantially planar active antenna element and a ground plane. Preferably, the active antenna element and the ground plane are arranged at a certain distance from each other, in order to provide a suitable bandwidth for the antenna at predetermined frequencies. The spacer 61 is made of a non-conductive material, such as some form of plastics. It has an upper surface 62 to which the flexible film is attachable, and in which upper surface a recess 63 is made for housing the speaker 41. In the illustrated embodiment, the upper surface 62 is curved such that a downwards projecting wall 64 is defined. As will be clear, the curved shape provides a suitable interface to the flexible film. The spacer further has spacing walls 65 projecting downwards from the upper surface 62. At the opposite side of upper surface 62, lower edges of spacing walls 65 define, together with the lower edge of wall 64, a lower plane side of the spacer 61. One or more protruding engagement members 66 is/are formed at the lower side of spacer 61, for engagement with a support structure.

FIGS. 7 to 9 illustrate mounting of the combined speaker and antenna element 50 of FIG. 5 to the spacer of FIG. 6, in a perspective view, though the leads and pads of the second portion 33 are left out for the sake of clarity. The first portion 31 carrying the conductive coating or layer is attached to the upper side 62 of spacer 61, preferably by use of an adhesive. The aperture 32 is oriented over the recess 63, and the film is pressed to the upper surface 62 such that it follows the curved shape of upper surface 62. In an alternative embodiment, wall 64 may be straight, like walls 65, but in that case there will be an edge where wall 64 meets upper surface 62. Such an embodiment may be employed if the flexible film allows sharp folding about an edge.

As is evident from FIG. 8, a lowermost portion 81 of the flexible film will extend outside spacer 61 when the film is attached thereto. This lowermost portion 81 preferably includes a lower part of first portion 31, and a proximal part of second portion 33 including proximal connection pads 36,37. Furthermore, second portion 33 preferably extends from this lowermost portion 81.

FIG. 9 illustrates how speaker 41 has been placed in the recess 63, by use of suitable attachment means. When positioning speaker 41 under the first portion 31 of the film, the second portion 33 is bent such that a front side of speaker 41 faces the first portion 31, as is illustrated in FIG. 9. As a result in accordance with the invention, the spacing between two cooperating antenna elements is not only used for providing sufficient bandwidth to the antenna, but also for housing the speaker 41, thereby also providing an acoustic resonance cavity for speaker 41. In FIG. 8, as well as in FIGS. 3 and 5, it has been illustrated that the elongated second portion 33 is not entirely straight, although it may be. Instead, second portion 33 has at least one bend in the plane of the film, in the rested state of the film. The purpose thereof is to suitably orient the elongated second portion 33 when it is bent under a side edge of the first portion 31, such that speaker 41 is positioned at the aperture 32.

Figure 10:
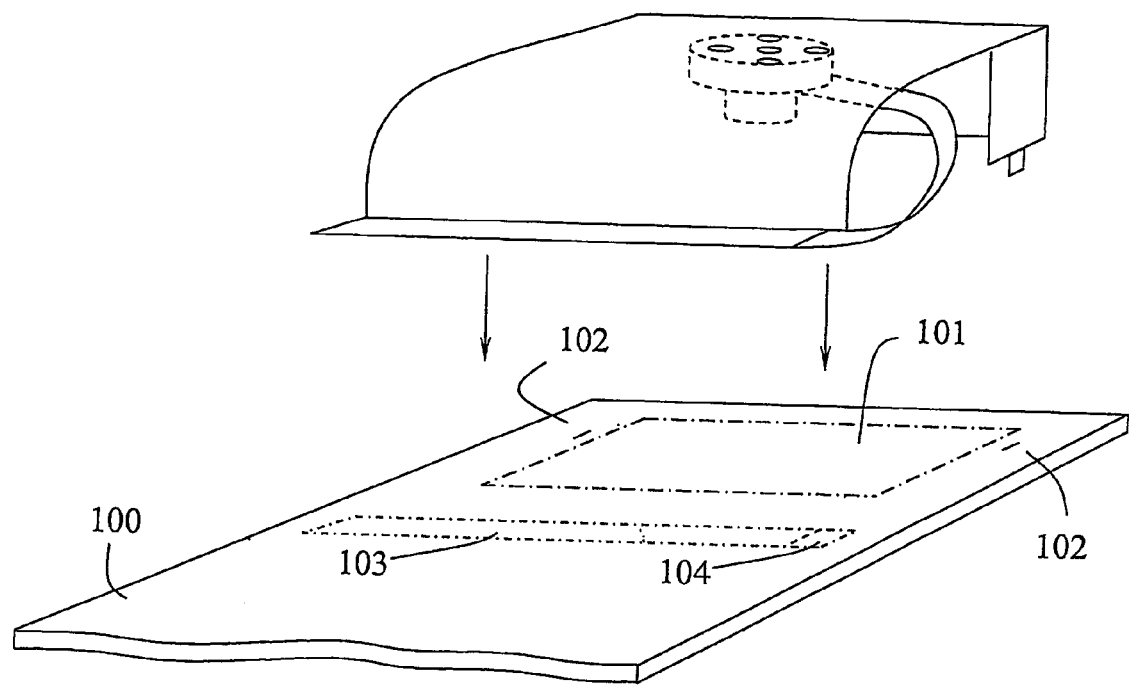
FIGS. 10 to 11 illustrates how an assembled device as shown in FIG. 9 is mounted to a carrier, such as a printed circuit board PCB, in accordance with an embodiment of the invention.
Figure 11:
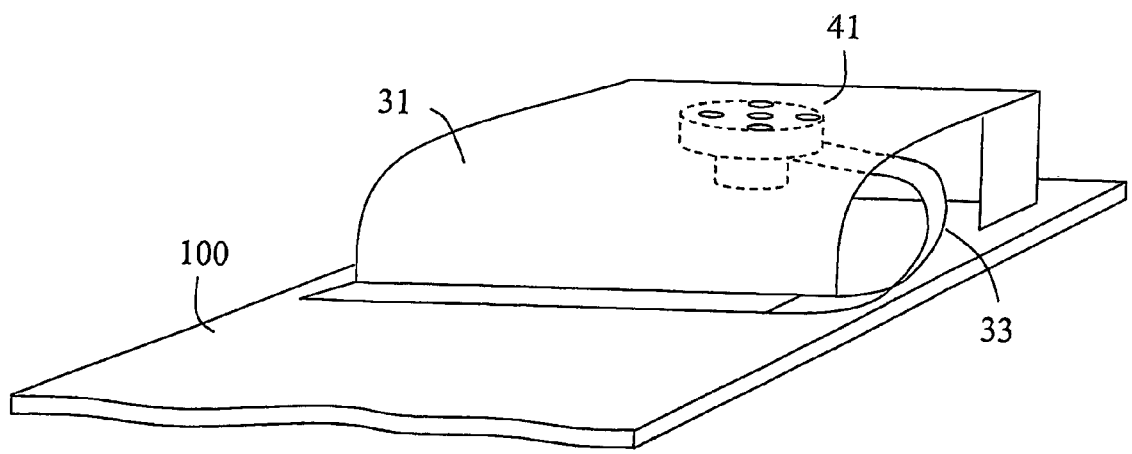

FIGS. 10 and 11 illustrates how the assembled device of FIG. 8 is attached to a support structure 100, for which only a top end is shown. Support structure 100 is preferably a Printed Circuit Board (PCB) carried in a chassis or housing of a radio communication terminal. The PCB 100 supports the electronics of terminal, though not shown in these drawings.

In FIG. 10 the support structure 100 is illustrated separate from the assembled spacer and flexible film. At 101 a cooperating antenna element is indicated by a dash-dotted line. Antenna element 101 cooperates, as previously mentioned, in a manner well known to the skilled person, with the antenna element constituted by the first conductive portion 31. Thanks to spacer 61, antenna element 101 and first portion 31 of the film will be arranged at a certain distance from each other. Antenna element 101 may be a ground plane to an active antenna element provided by first portion 31. However, in a preferred embodiment antenna element 101 is an active part of the antenna, having a suitable pattern in a plane of the support structure such that resonance is established for predetermined radio frequencies. In this preferred embodiment, first portion 31 of the flexible film provides the ground plane for the antenna.

One or more recessed engagement members 102 is/are formed in the support structure, for engagement with the protruding engagement members 66 at the lower side of spacer 61. Engagement of spacer 61 to support structure 100 may be achieved by a self-locking snap lock.

A conductive connection area 103,104 is further illustrated by dashed lines in FIG. 10, devised for connection with the lowermost portion 81 of the flexible film. Preferably, the conductive first portion 31 of the flexible film is connected at lowermost portion 81 to a first section 103 of said connection area by hot bar soldering. This way connection between support structure 100 and first portion 31 is created along substantially the entire width of first portion 31. In a preferred embodiment, an auxiliary ground plane (not shown) is provided in the support structure 100, in an intermediate layer or on a surface thereof, which auxiliary, ground plane is connected to the ground plane of first portion 31 at connection area section 103. This way, and particularly due to the wide connection at connection area 103, a large and continuous ground plane is provided, which will be beneficial to the performance of the antenna. The auxiliary ground plane may extend a limited portion of the length of the support structure, but preferably substantially all the way to a an end side of the support structure 100, opposite the illustrated top end. A second section 104, electrically separate from first section 103, of the connection area is provided for connection with the proximal connection pad 36, or separate connection to proximal connection pads 36,37 if there are plural leads 34, 35, of second portion 33. The entire lowermost portion 81 is preferably attached to the designated sections 103,104 of said connection area in a single hot bar soldering action.

FIG. 11 illustrates the device according to FIG. 9 when assembled to the support structure 100, in accordance with the arrows in FIG. 10.

Figure 12:
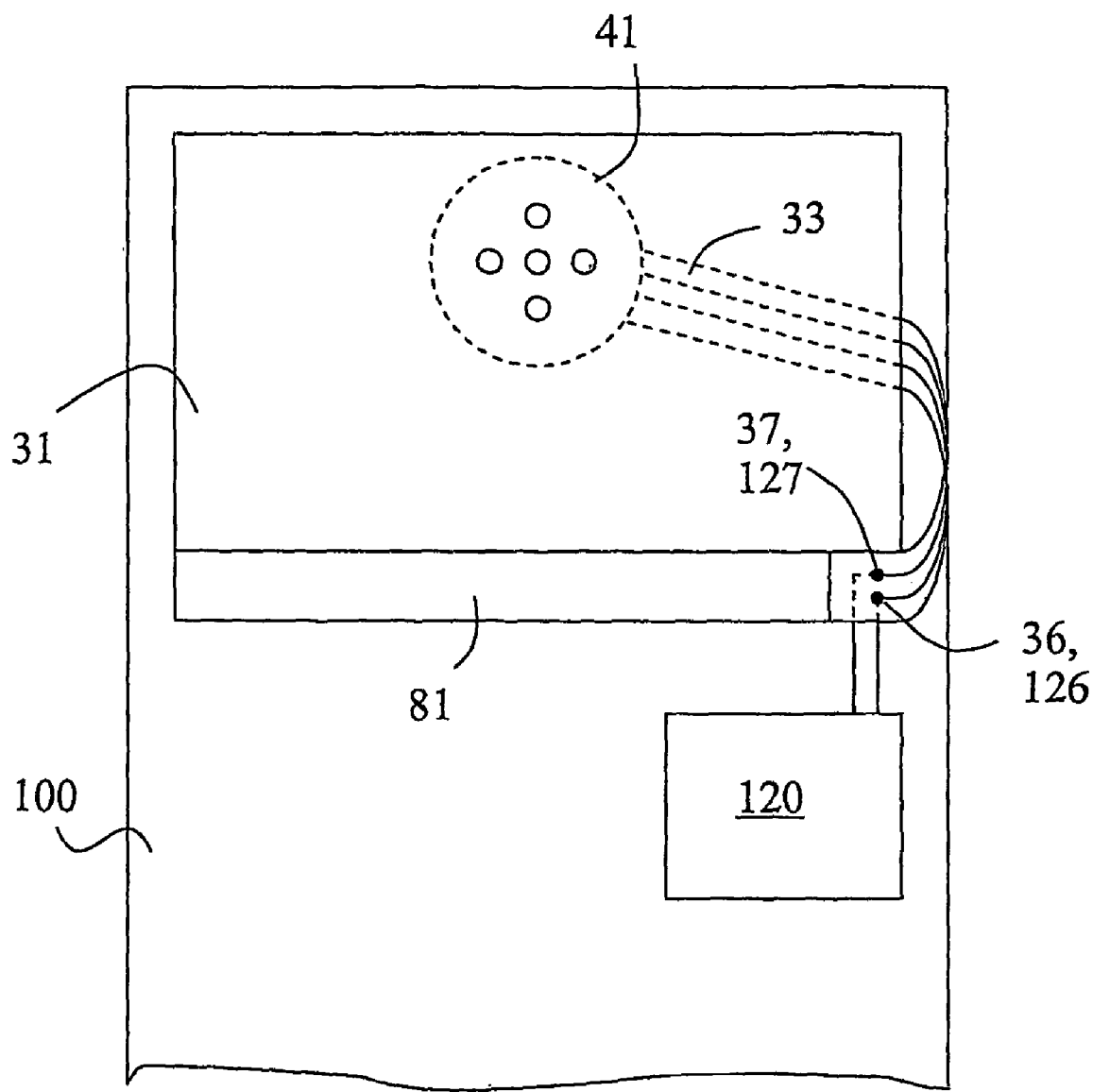
FIG. 12 illustrates an elevated view of the assembled and mounted device of FIG. 11, in accordance with an embodiment of the invention.

FIG. 12 shows a top view of the assembled device according to FIG. 11. The conductive first portion 31 of the flexible film extends into lowermost portion 81, at which it is connected to the designated section 103 of the connection area on the support structure 100, and preferably the auxiliary ground plane. The second portion 33 of the flexible film is bent and folded such that speaker 41, attached to the outer end 40 of second portion 33, is placed behind aperture 32. At said second section 104 of connection area, proximal connection pads 36,37 are connected to respective connectors 126,127. These connectors 126,127 are, in turn, connected to speaker control circuitry 120 arranged on said support structure, devised to provide speaker signals to speaker 41.

The present invention brings about several advantages, thanks to the inventive idea to mount the speaker inside the antenna cavity, where one antenna element and the speaker are carried by a common structure provided by a flexible film.

First of all, the invention brings about space savings. A terminal or housing, implementing the invention, may be designed with a thickness basically defined by the distance between the flexible film and the support structure, e.g. a PCB, since the thickness contribution from the speaker has been eliminated. Furthermore, even though the antenna cavity 21 has been partly occupied by the speaker, experimental laboratory tests on this design have surprisingly shown that the presence of the speaker will not result in reduced antenna performance if tuned properly. The use of hot bar soldering will not lead to bulging solder pads, which also contributes to saving space.

Second, a single component having plural functions, i.e. providing an antenna element, leads to a speaker, and pads for connection both to the speaker and speaker control circuitry, provides a logistics advantage since fewer details are involved in the assembly.

By the proposed design the amount of metal in the vicinity of the antenna is minimised, since no extra contacts or wires to the speaker are needed, and very little metal is included in the thin and narrow leads formed on the film. This means less negative impact on the performance of the antenna.

Finally, the hot bar soldering along substantially the entire width of the antenna element provided by first portion 31 on the flexible film, ensures a large continuous ground plane with increased antenna performance as a consequence.

The foregoing has described the principles, preferred embodiments and modes of operation of the present invention. However, the above described embodiments should be regarded as illustrative rather than restrictive, and it should be appreciated that variations may be made in those embodiments by those skilled in the arts without departing from the scope of the present invention as defined in the appended claims.

The invention claimed is:

1. Integrated speaker carrier and antenna element for a communication terminal, comprising:
   a sheet of a flexible film having a conductive first portion forming a first antenna element; and
   an elongated second portion carrying a conductive lead, the elongated second portion including an inner end that is adjacent to the conductive first portion and an outer end that is connected to a speaker, such that the elongated second portion has a length defined by the inner end and the outer end and extends away from the conductive first portion and the inner end to the speaker and the outer end along at least a portion of the length;
   wherein said elongated second portion is bent such that a primary audio output side of the speaker faces the first portion and that said speaker and said outer end of said elongated second portion are positioned at an aperture in said first portion,
   wherein a support structure carrying a second antenna element is arranged at a predetermined distance from said first antenna element, which said first and second antenna elements form a spacing for housing the speaker; and
   wherein said flexible film is made from an insulating material, and wherein said first conductive portion and said lead form parts of a layer of a conductive material coated on said flexible film.

2. The integrated speaker carrier and antenna element as recited in claim 1, wherein said second portion carries a pair of conductive leads from adjacent said first portion to respective speaker connection pads at said outer end.

3. The integrated speaker carrier and antenna element as recited in claim 1, wherein said second portion carries at least one conductive lead which is electrically insulated from said first portion.

4. The integrated speaker carrier and antenna element as recited in claim 1, wherein said conductive lead extends from a connection pad arranged adjacent to said first portion at a straight edge of said flexible film.

5. The integrated speaker carrier and antenna element as recited in claim 1, wherein said conductive first portion is a ground plane of an antenna for a radio communication terminal.

6. The integrated speaker carrier and antenna element as recited in claim 1, wherein said conductive first portion is an antenna element of an antenna for a radio communication terminal, and has a pattern adapted to provide resonance at predetermined radio frequencies.

7. The integrated speaker carrier and antenna element as recited in claim 1, wherein said flexible film is attached to said support structure such that said conductive first portion is electrically connected to a ground plane of said support structure.

8. The integrated speaker carrier and antenna element as recited in claim 1, wherein said flexible film is attached at a side edge thereof to said support structure, at which a side edge of a connector pad to said conductive lead is arranged.

9. The integrated speaker carrier and antenna element as recited in claim 8, wherein said connector pad is connected, at said side edge thereof, to speaker control circuitry arranged on said support structure.

10. The integrated speaker carrier and antenna element as recited in claim 1, wherein said flexible film is bar soldered at a straight edge to said support structure, said conductive first portion being electrically connected to a ground plane of said support structure at said straight edge, and wherein a connector pad to said conductive lead is connected to speaker control circuitry arranged on said support structure.

11. The integrated speaker carrier and antenna element as recited in claim 1, wherein an insulating spacer is arranged intermediate said support structure and said flexible film, defining said predetermined distance between said first and second antenna elements.

12. The integrated speaker carrier and antenna element as recited in claim 11, wherein said spacer comprises speaker attachment means devised to secure said speaker adjacent to said aperture.

13. The integrated speaker carrier and antenna element as recited in claim 11, wherein said flexible film is attached to said spacer with an adhesive.

14. The integrated speaker carrier and antenna element as recited in claim 11, wherein said spacer is attached to said support structure by cooperating engagement members.

15. The integrated speaker carrier and antenna element as recited in claim 11, wherein said spacer has a protruding member engaging with a recess in said support structure.

16. The integrated speaker carrier and antenna element as recited in claim 1, wherein said support structure is a printed circuit board of a radio communication terminal.

17. A radio communication terminal, comprising an integrated speaker carrier and antenna element as recited in claim 1.

18. A method of manufacturing an integrated speaker carrier and antenna element for a communication terminal, comprising:
   providing a flexible film of an insulating material, having a first conductive surface portion forming a first antenna element, and an elongated second portion having an inner end adjacent to said first portion, said elongated second portion carrying a lead insulated from said first portion;
   attaching a speaker to an outer end of the elongated second portion, connected to said lead;
   forming an aperture in said first portion; and
   bending the elongated second portion such that a primary audio output side of the speaker faces the first portion and said speaker and that said outer end of the elongated second portion are positioned at the aperture;
   arranging a support structure carrying a second antenna element at a predetermined distance from said first antenna element, the two antenna elements forming a spacing for housing the speaker;
   wherein the elongated second portion has a length defined by the inner end and the outer end and extends away from the conductive first surface portion and the inner end to the speaker and the outer end along at least a portion of the length.

19. The method as recited in claim 18, wherein providing a flexible film comprises:

coating said insulating film with a conductive material;

removing selected portions of the conductive material from the film, to define the first conductive surface portion and the lead; and cutting the film such that the elongated second portion thereof, carrying said lead, is shaped.

20. The method as recited in claim 19, wherein removing selected portions of the conductive material comprises etching.

21. The method as recited in claim 19, wherein removing selected portions of the conductive material comprises defining a pair of separate leads insulated from said first portion and extending away from adjacent to said first portion.

* * * * *